United States Patent
Hardt et al.

(10) Patent No.: US 11,032,771 B2
(45) Date of Patent: *Jun. 8, 2021

(54) ELECTRONIC APPARATUS HAVING A FIRST RADIO, AND A SECOND LOW POWER RADIO FOR WAKING THE FIRST RADIO

(71) Applicant: ARRIS Enterprises LLC, Suwanee, GA (US)

(72) Inventors: Charles Hardt, Lawrenceville, GA (US); Dmitry Barablin, Lawrenceville, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/450,769

(22) Filed: Jun. 24, 2019

(65) Prior Publication Data

US 2019/0313336 A1 Oct. 10, 2019

Related U.S. Application Data

(63) Continuation of application No. 14/865,438, filed on Sep. 25, 2015, now Pat. No. 10,375,637.

(51) Int. Cl.
*H04W 52/02* (2009.01)
*H04L 12/12* (2006.01)
(Continued)

(52) U.S. Cl.
CPC ........ *H04W 52/0229* (2013.01); *G06F 1/325* (2013.01); *H04L 12/12* (2013.01); *H04W 84/12* (2013.01); *Y02D 30/70* (2020.08)

(58) Field of Classification Search
None
See application file for complete search history.

(56) References Cited

U.S. PATENT DOCUMENTS

| 9,763,189 B2 | 9/2017 | Ang et al. |
| 2003/0003876 A1 | 1/2003 | Rumsey |

(Continued)

OTHER PUBLICATIONS

J. Hangki, et al., "A hybrid Wi-Fi P2P with bluetooth low energy for optimizing smart device's communication prop", Peer-to-Peer Networking and Applications, vol. 8, No. 4, Apr. 25, 2014, pp. 567-577.

(Continued)

*Primary Examiner* — Jeffrey M Rutkowski
*Assistant Examiner* — Basil Ma
(74) *Attorney, Agent, or Firm* — Wenderoth, Lind & Ponack, L.L.P.

(57) ABSTRACT

An electronic apparatus used with a separate electronic device, and including: a first radio that wirelessly communicates with the electronic device at a first transmission power in a first power range according to a first wireless protocol; and a second radio that wirelessly communicates the electronic device at a second transmission power in a second power range, that is lower than the first power range, according to a second wireless protocol. The electronic apparatus includes a control circuit that determines whether the first radio is in a power-down state or a power-up state, determines whether a predetermined condition exists, powers-down the first radio when the predetermined condition exists, determines whether a predetermined message is received by the second radio, and powers-up the first radio when it is determined that the predetermined message is received while the first radio is in the power-down state.

5 Claims, 4 Drawing Sheets

(51) Int. Cl.
  *G06F 1/3234*  (2019.01)
  *H04W 84/12*  (2009.01)

(56) References Cited

U.S. PATENT DOCUMENTS

| | | |
|---|---|---|
| 2006/0075269 A1 | 4/2006 | Liong et al. |
| 2009/0221303 A1 | 9/2009 | Soliman |
| 2010/0279745 A1 | 11/2010 | Westcott et al. |
| 2011/0116429 A1 | 5/2011 | Jeon et al. |
| 2012/0190390 A1 | 7/2012 | Reunamaki et al. |
| 2012/0250731 A1 | 10/2012 | Taghavi Nasrabadi et al. |
| 2013/0109323 A1 | 5/2013 | Ruutu et al. |
| 2013/0178163 A1 | 7/2013 | Wang |
| 2014/0153460 A1 | 6/2014 | Shrivastava et al. |
| 2014/0192692 A1 | 7/2014 | Stark et al. |
| 2016/0066274 A1 | 3/2016 | Pujari et al. |
| 2017/0026907 A1* | 1/2017 | Min .................. H04W 52/0254 |

OTHER PUBLICATIONS

Office Action dated Nov. 17, 2020 in CA Patent Application No. 2,998,575.
Extended European Search Report dated Dec. 9, 2020 in European Patent Application No. 20193432.0.

* cited by examiner

ELECTRONIC APPARATUS HAVING A FIRST RADIO, AND A SECOND LOW POWER RADIO FOR WAKING THE FIRST RADIO

CROSS-REFERENCES TO RELATED APPLICATIONS

The present application is a continuation of U.S. patent application Ser. No. 14/865,438 filed on Sep. 25, 2015, now issued as U.S. Pat. No. 10,375,637 on Aug. 6, 2019, entitled "Electronic Apparatus Having a First Radio, and a Second Low Power Radio for Waking the First Radio", the contents of all of which are incorporated herein by reference in its entirety.

BACKGROUND

Electronics manufacturers, cable service providers, and multiple system operators (MSOs) strive to provide products that are energy efficient in order to save money for customers and to meet governmental regulations. The voluntary Energy Star rating of the U.S. Environmental Protection Agency (EPA) is an example of such a regulation. In order to earn an Energy Star label, products are certified by a third-party organization based on testing in EPA-recognized laboratories.

A popular electronic apparatus in many homes is the so called "set-top box" which houses electronic circuits that convert signals from an input line into signals usable by consumer devices for displaying data and audio/video media content such as television programing and movies. The types of consumer devices being served by set-top boxes will become more varied, including not only televisions, but computers, and portable devices such as electronic tablets and smart phones. The input signals can be provided by service providers including cable television providers, satellite television providers, internet service providers, and multiple system operators. In addition to being provided in the self contained set-top box configuration, the electronics can be integrated directly into the consumer device, such as being built into a television. For ease of discussion, the set-top box configuration will be referred to hereafter, but the invention is not intended to be limited only to set-top boxes.

To determine the most effective approach for power savings for a set-top box it is necessary to analyze the allocation of power consumption by the various functions provided by the apparatus. In addition to basic cable television functions and/or Internet Protocol Television (IPTV) functions, the set-top boxes disclosed herein may include computer network connectivity functions, including Local Area Network (LAN) interfaces, and Wireless Local Area Network (WLAN) interfaces which use wireless signals, such as Wi-Fi or in-home LTE (Long Term Evolution) technology, or the like. Network interfaces are high power consumption features on a set-top box.

In order to achieve the maximum level of savings it has been found by the inventors that it is necessary to power down all of the network interfaces of the set-top box. For ease of installation and maximization of potential locations in the home, the set-top boxes disclosed herein are not required to be connected to the home network via a wired connection, but rather may exclusively use a Wi-Fi connection. In the case of such a Wi-Fi-only set-top box, to power down the network interface the Wi-Fi radio must be powered down. The radio on a Wi-Fi only set-top box is responsible for approximately 50% of the power consumption of the device. Typical power consumption of a Wi-Fi radio can be anywhere between 2 and 3 watts, even in a receive-only mode, and higher in a full transmission mode.

The set-top box can be put into a low power mode in which the Wi-Fi radio and WLAN interface are powered down. A set-top box in such a low-power mode can be quickly brought back up to full operational mode via a user input, such as by a button being pushed on the set-top box by the user. However such a manual operation is not suitable in many instances. For example, service providers typically perform remote management operations, such as code downloads and software upgrades, during non-peak off hours, such as during the over night and early morning hours while most customers are asleep. For example, most set-top boxes are not in use during the period of time between 12:00 AM and 7:00 AM.

Wake on LAN (WoL) is a networking operation that allows a network connected device to be turned on or awakened via a network message. The message is usually sent by another computer or device on the same local area network. It is also possible to initiate the message from another network outside the local area network, such as by using subnet directed broadcasts or by a WoL gateway service. When the device being awakened is communicating via Wi-Fi, a supplementary standard called Wake on Wireless LAN (WoWLAN) must be employed. However, Wake on LAN and Wake on Wireless LAN require the radio to be marginally operational in order for the feature to work. Therefore, relying on WoL and WoWLAN for waking a set-top box for service provider management operations would negate expected power savings because the Wi-Fi radio would need to remain in some marginal operation state such as a receive only mode. Because of these drawbacks of existing technologies, there is a need to wake a Wi-Fi-only set-top box while it is in a low power mode in which the Wi-Fi radio is powered down.

SUMMARY OF THE INVENTION

The present application discloses an electronic apparatus and method for saving power use by the electronic apparatus.

The electronic apparatus is used with a separate electronic device, and includes: a first wireless communication circuit that wirelessly communicates information with the electronic device at a first transmission power in a first power range according to a first wireless protocol; and a second wireless communication circuit that wirelessly communicates information with the electronic device at a second transmission power in a second power range, that is lower than the first power range, according to a second wireless protocol.

The electronic apparatus also includes a control circuit that controls the first and second wireless communication circuits, determines whether the first wireless communication circuit is in a power-down state or a power-up state, determines whether a predetermined condition exists, powers-down the first wireless communication circuit when the predetermined condition exists, determines whether a predetermined message is received by the second wireless communication circuit, and powers-up the first communication circuit when it is determined that the predetermined message is received via said second communication circuit while the first wireless communication circuit is in the power-down state.

The predetermined condition can be that the electronic apparatus has been in a non-use state for more than a predetermined period of time. The first protocol can be at least one of a Wi-Fi protocol or an LTE protocol. The second protocol can be at least one of a Bluetooth protocol or an RF4CE protocol. The first power range is, for example, greater than 100 mW and less than or equal to 1 Watt, and the second power range is, for example, 1-100 mW. The second transmission power can be approximately 100 mW.

The control circuit can also be configured to send the predetermined message via the second wireless communication circuit for instructing the separate electronic device to power on a wireless communication circuit in the separate electronic device. In this way, the electronic apparatus can function as the gateway interface or master device and control the powering up of another electronic client device or devices.

The method or algorithm for saving power in an electronic apparatus includes determining, by a control circuit, whether a first wireless communication circuit, that wirelessly communicates information at a first transmission power in a first power range according to a first wireless protocol, is in a power-down state or a power-up state; determining whether a predetermined condition exists; sending an electronic signal to power-down the first wireless communication circuit when the predetermined condition exists; determining whether a predetermined message is received by a second wireless communication circuit, that wirelessly communicates information at a second transmission power in a second power range, that is lower than the first power range, according to a second wireless protocol; and sending an electronic signal to power-up the first communication circuit when it is determined that the predetermined message is received via the second communication circuit while the first wireless communication circuit is in the power-down state.

The method can also or alternatively include sending of the predetermined message via the second wireless communication circuit for instructing a separate electronic device to power on a wireless communication circuit in the separate electronic device. In this way, the method can be implemented by an electronic apparatus functioning as the gateway interface or master device and can control the powering up of another electronic client device or devices.

DETAILED DESCRIPTION

Figure 1:
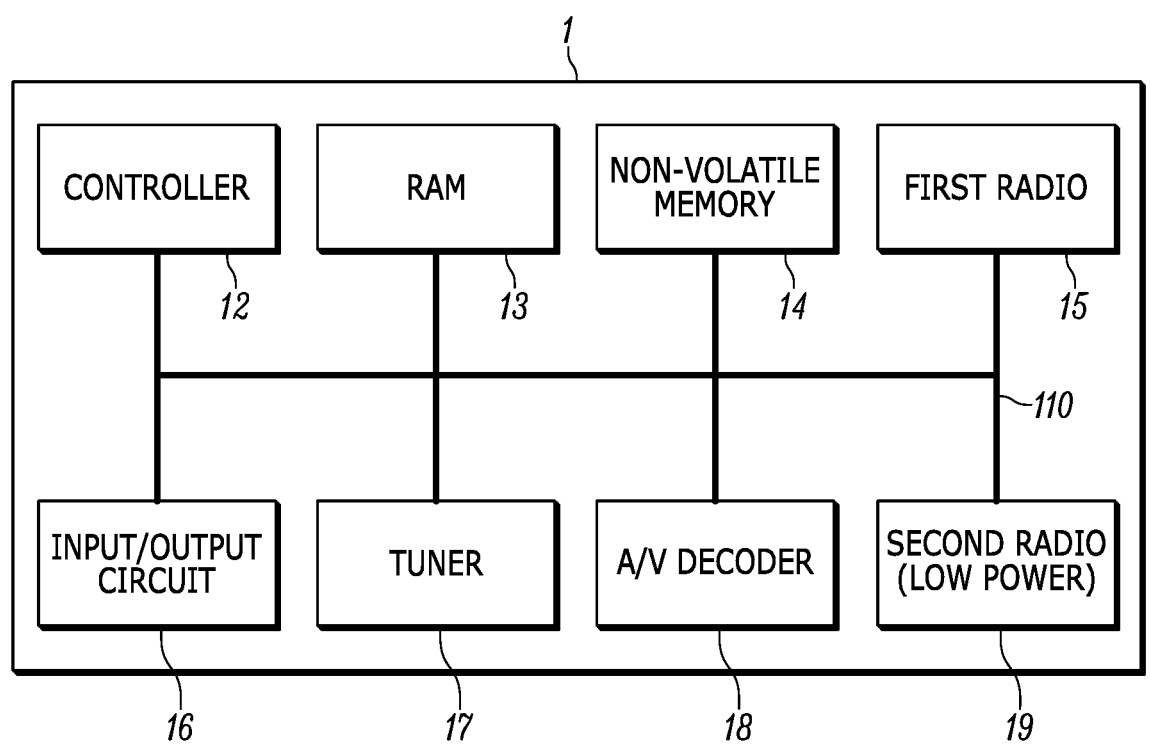
FIG. 1 is a block diagram of an electronic apparatus according the present invention.

An electronic apparatus according to the present invention, e.g., a set-top box 1, is shown in FIG. 1. The electronic apparatus includes circuitry by which the wireless network interface of the apparatus can be remotely powered up from a power-down low-power consumption state. For ease of discussion, the electronic device will be explained in the configuration of a set-top box hereafter, but the invention is not intended to be limited only to set-top boxes and can alternatively be integrated directly into a consumer device such as a television, computer, or any other consumer device, such as electronically equipped appliances.

The set-top box 1 includes bus lines 110 through which various circuits are connected and communicate data with each other. A controller 12, which can be a dedicated control circuit, CPU, microprocessor, etc., controls the circuits of the set-top box 1. RAM 13 can be provided as a working memory for the controller 12, and a non-volatile memory 14 can be provided for storage of program code, and user Audio/video content and other data.

The set-top box 1 may include an input/output circuit 16, which can include one or more connectors, such as RF connectors or Ethernet connectors. One of the connectors of the input/output circuit 16 can be connected to a content provider, such as a multiple system operator (MSO), by terrestrial antenna, satellite dish, or wired cable. Through the input/output circuit 16, the set-top box 1 receives an input signal, including data and/or audio/video content, from the content provider and can send data to the provider.

The set-top box can include a QAM/QPSK/etc. tuner 17 to select a desired channel from the input signal based on an input instruction by the user either through a button or buttons on the set-top box, not shown, via a remote control, also not shown, or via a user device such as a computer, electronic tablet device, or mobile phone. The signal of the selected channel is decoded by the Audio-Video decoder 18. It should be noted that the Wi-Fi receiver can also inject an Audio/Video stream into the Audio-Video decoder 18. The input/output circuit 16 can also include a connector that is to be connected to the user's content playing device, such as a television, for displaying audio-video content received by the set-top box 1 and decoded by the audio/video decoder 18.

A first radio 15, (also referred to as a first wireless communication circuit or interface), such as a Wi-Fi WLAN interface radio transceiver, or an in-home LTE (Long Term Evolution) transceiver outputs the signal of the selected channel to a wireless user device. The wireless output by the first radio 15 can be in place of or in addition to the wired output by the Input/Output circuit 16. The set-top box 1 can output the signals of respective selected channels to plural devices simultaneously, and otherwise wirelessly communicate with the plural devices simultaneously.

In order to allow an installation of the electronic apparatus 1 in a manner in which no physical cable input is required, the input signal from the service provider can be received by a separate electronic device, such as a cable modem, or a different set-top box, and the signal can be communicated to the set-top box 1 wirelessly via the first radio 15. In such a scenario, the set-top box 1 could be provided without the input/output circuit. Also, the set-top box 1 can provide the content according to Internet Protocol Television (IPTV), in which can the tuner 17 may be omitted as well.

The first radio 15 also receives command and control messages, including code downloads and software updates, sent from the service provider.

The first radio 15 communicates via 2.4 GHz band with a bandwidth of 22 MHz and a data rate up to 150 Mbit/s, or via the 5 GHz with a bandwidth of 20 MHz and a data rate up to 866.7 Mbit/s, or via 60 GHz band with a bandwidth up to 2160 MHz and a data rate of up to 6.75 Gbit/s. The first radio 15 has a transmission power suitable to communicate within the desired range for the particular application. Therefore the power consumption of the radio transceiver depends on the intended application and desired range. For example, for a typical home application, the transmission power of the first radio 15 is 1 watt, in which case the power consumption is approximately between 2 and 3 watts. However, transmission power can be higher depending on the necessary range for a given application.

In addition to the first radio 15, the electronic apparatus 1 is also equipped with another, low power, second radio 19, (also referred to as a second wireless communication circuit or interface), for exchanging data over short distances in a frequency range of 2400-2483.5 MHz. The second radio 19 can maintain simultaneous wireless connections with plural devices, consumes substantially less power than the first radio 15, and has a lower data rate and data throughput than the first radio 15. For example the second radio 15 can be a radio meeting a Bluetooth protocol, IEEE802.11 protocol, a Radio Frequency For Consumer Electronics (RF4CE) protocol, zigbee protocol, and/or IEEE802.15.4 protocol.

The second radio 19 can maintain plural simultaneous connections, for example seven simultaneous connections. The second radio 19 can be a class-one transmitter with a transmission power in a range of greater than 1 mW and less than or equal to 2.5 mW, or a class-two transmitter with a transmission power in a range of greater than 2.5 mW and less than or equal to 100 mW. For example, the transmission power can be 2.5 mW which gives the second radio 19 a range of approximately 30 feet. As another example, the transmission power can be 100 mW which gives the second radio 19 a range of approximately 300 feet. With such ranges, the second radio can connect to all other wireless devices in an average sized home.

The second radio 19 has a lower data rate than the first radio 15. For example, the second radio 19 can have a data rate in the range of 1 Mbit/s to 24 Mbit/s inclusive. However, the second radio 19 is capable of sending and receiving command and control messages even with its lower data rate.

Plural electronic apparatuses of the same or different types may be in some location, such as a home, apartment building, hotel, office. For example, in such an environment, a first electronic apparatus may be in the form of a set-top box 1 as shown in FIG. 1, or can alternatively be a modem, or electronic device in an appliance, and scaled to include select components shown in FIG. 1 as needed depending on the application of the particular apparatus. Likewise, a second electronic apparatus can be also be configured as a set-top box 1, or electronic device in an appliance, and scaled to include select components shown in FIG. 1 as needed depending on the application of the particular apparatus. The plural electronic apparatuses are in communication with one another and can also be in communication with other electronic apparatuses. One or more of the plural electronic apparatuses functions as a gateway apparatus to provide one or more access points to the internet.

Figure 2:
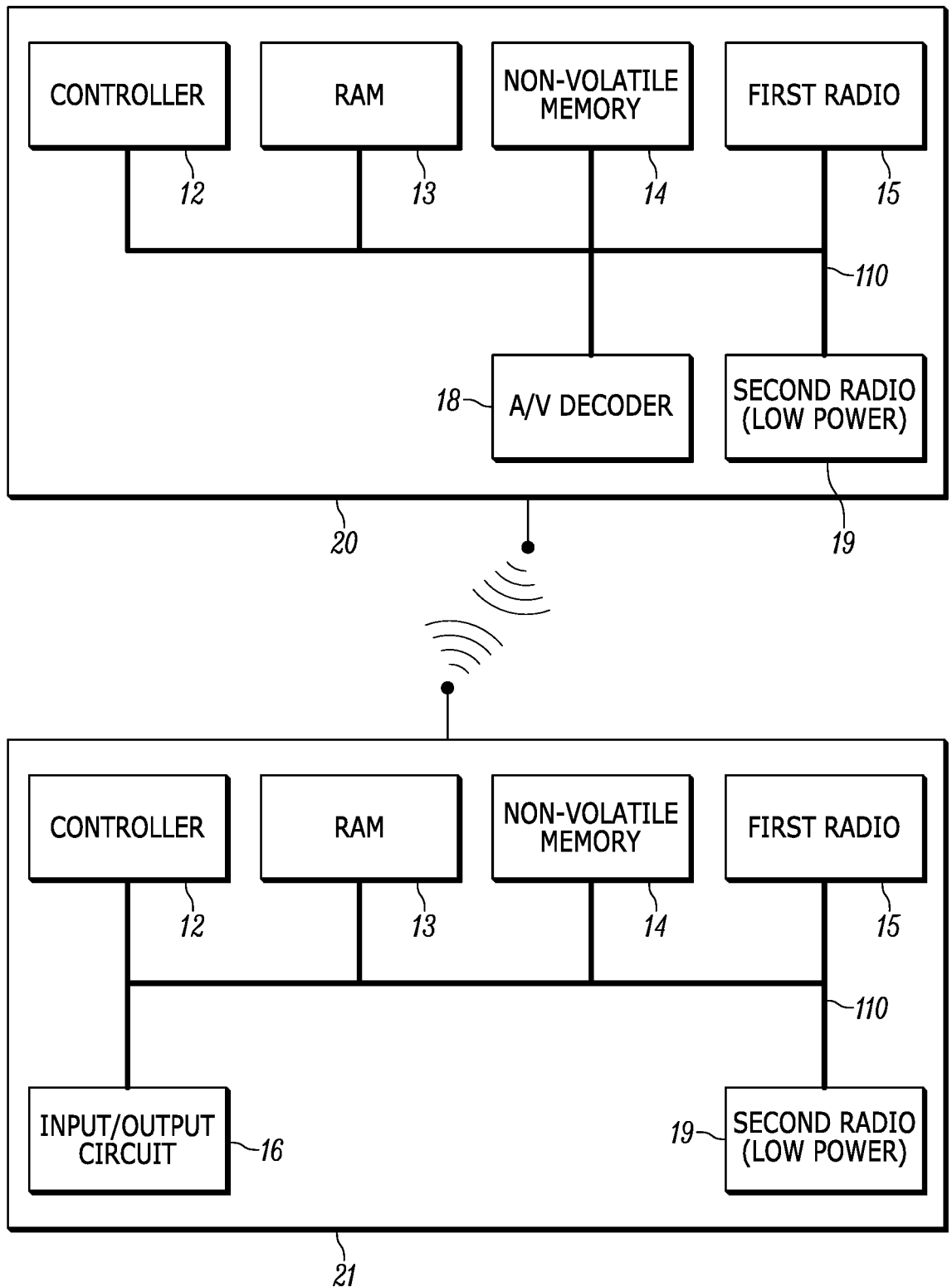
FIG. 2 is a block diagram showing an example of an implementation of a plurality of electronic apparatuses according to the present invention.

An example of such a plural electronic apparatus configuration in a location is shown in FIG. 2 in which a plurality of electronic apparatuses, including a first electronic apparatus 20 is in communication with a second electronic apparatus 21 having its own first radio and second radio. Like reference numerals denote like parts. The electronic apparatuses 20 and 21 are connected to a WLAN via their respective first radios 15. The second electronic apparatus 21 serves as the gateway of the WLAN to the service provider. The second electronic apparatus 21 can be identical to the set-top box 1, or can be a different type apparatus such as a cable modem, which may include circuits shown in FIG. 1, such as the input/output circuit while omitting others as need be. The first electronic apparatus 20 is a client device of the second electronic apparatus 21.

In the present example, the first electronic apparatus 20 is a set-top box that is not connected by cable to the provider, and therefore may be configured to omit the input/output circuit 16, but communicates with the provider through its first radio 15 via the second electronic apparatus 21. The first electronic apparatus can be configured to omit the tuner 13, and provide service using IPTV methods.

Figure 3:
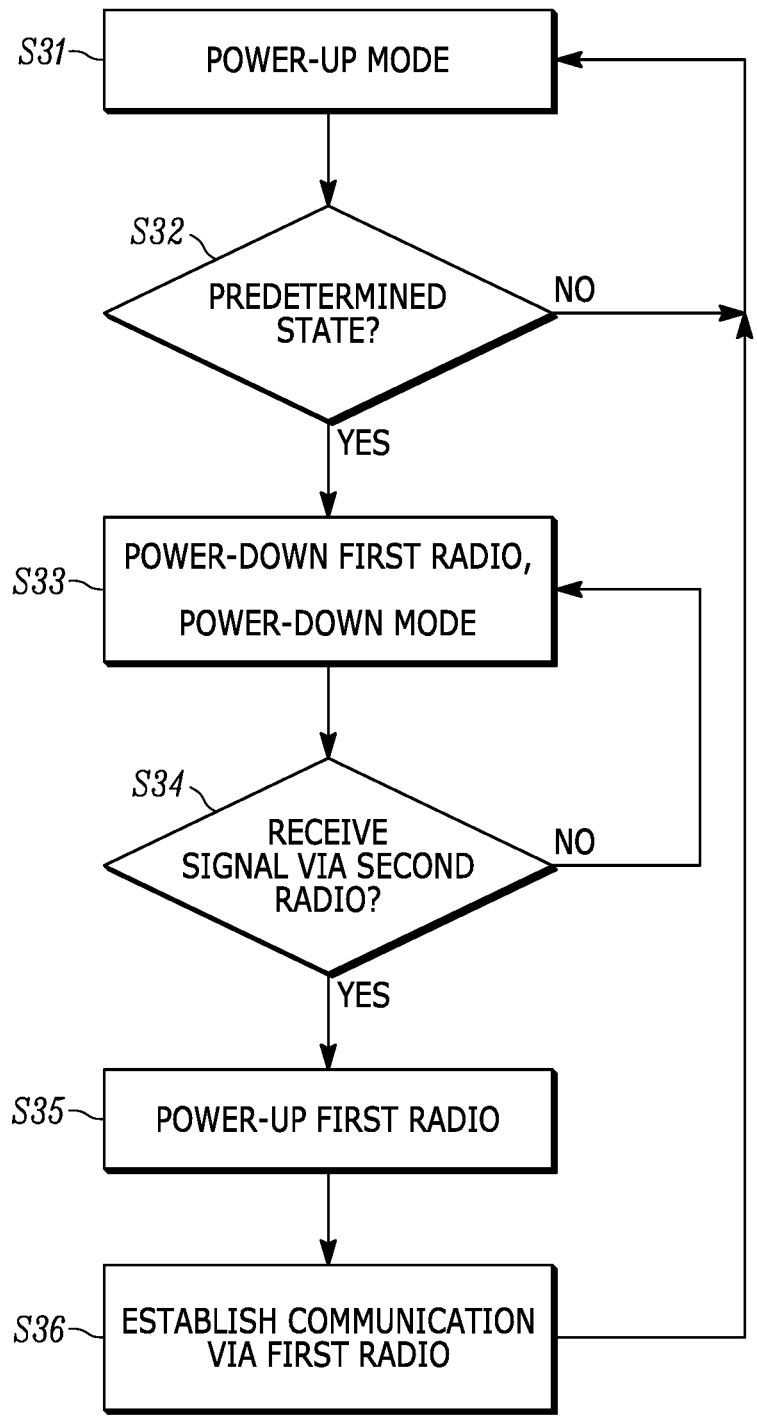
FIG. 3 is a flow chart of an algorithm implemented by the electronic apparatus for powering down and powering up the first radio.

As shown in FIG. 3, the controller 12 of the first electronic apparatus 20 controls the components of the first electronic apparatus 20 to implement different modes of operation, including a power-up state, and a power saving mode, also referred to as a power-down state. In step S31, the electronic apparatus is functioning and is in the power-up mode. When in the power-up mode, in step S32 the controller 12 of the first electronic apparatus 20 monitors for the existence of a predetermined state. While the predetermined state does not occur, the controller 12 keeps the electronic apparatus in the power-up state. When the controller 12 of the first electronic apparatus 20 determines that the predetermined state exists in step S32, the controller 12 powers down the first radio 15 of the first electronic apparatus 20. The predetermined state could be, for example, the elapsing of a predetermined amount of time of non-use of the first electronic apparatus 20. The controller determines such a non-use by detecting a lack of activity or particular activity by the first radio 15 or the controller 12. Once the non-use condition has existed for the predetermined amount of time, the controller 12 sends an instruction through the bus 110 to power down the first radio 15 of the first electronic apparatus 20.

Service providers, including MSOs, tend to perform network maintenance and/or code downloads during the early morning hours. During such hours it is likely that the first electronic apparatus 20 will be in the power-down state where the first radio 15 is powered down. In such a condition the first electronic apparatus 20 cannot receive command and control messages from the service provider. With prior art devices, such a situation would require some user input, such as the user pressing a button on the set-top box or remote control, in order to wake the apparatus. However, the first electronic apparatus 20 includes the second radio 19, which is a lower-power radio than first radio 15.

The second radio 19, (e.g., Bluetooth, or RF4CE), maintains a command and control data connection between the first electronic apparatus 20 and the second electronic apparatus 21. The second electronic apparatus 21 functions as the gateway in the present example and maintains communication with the service provider, e.g., via a DOCSIS (Data Over Cable Service Interface Specification) connection.

Figure 4:
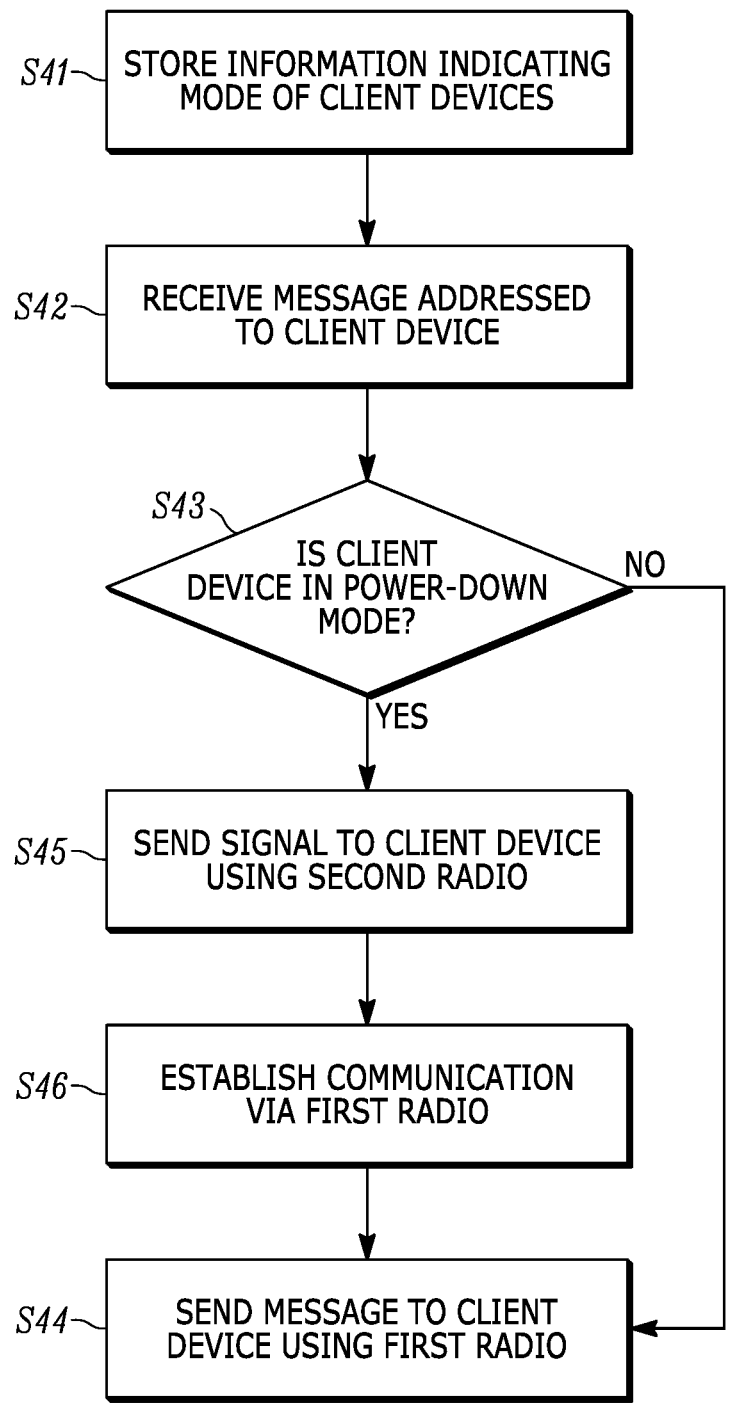
FIG. 4 is a flow chart of an algorithm implemented by the electronic apparatus as a gateway apparatus.

In the low power state, the low power second radio 19 of first electronic apparatus 20 remains powered up, while the relatively higher power first radio 15 is powered down. While in the power-down state, the controller 12 of the first electronic apparatus 20 is still able to determine if a signal is received by the low power radio 19 of the first electronic apparatus 20. In step S34 of FIG. 3, the controller 12 monitors whether a signal is received by the second radio 19 of the electronic apparatus 19. If no such signal is received, the controller maintains the first electronic apparatus 20 in the power-down state. When a command/control message, such as a code download, is sent to by the service provider and addressed to the first electronic apparatus 20, the message is actually received by the gateway second electronic apparatus 21 via the connection with the service provider, (e.g., via DOCSIS). As shown in FIG. 4, step S41, the controller 12 of the second electronic apparatus 21 stores in its memory 13 or 14 information indicating that the first electronic apparatus 20 (and any other client devices served by the gateway second electronic apparatus 21), is in the low power mode. In step S42, the second electronic apparatus 21 receives a command/control message addressed to first electronic apparatus 20 (a client device) and in step S43 the controller 12 of the second electronic apparatus 21 determines whether the first electronic apparatus 20 is in the power-down mode by referring to the information stored in the memory 13 of 14. If the controller 12 determines that the first electronic apparatus is not in the power-down mode, then in step S44 the controller 12 of the second electronic apparatus 21 sends the message received via the input/output circuit 16 to the first electronic apparatus using the first radio 15 of the second electronic apparatus 21.

If in step S43 the controller 12 determines that the first electronic apparatus is in the power-down mode, then in step S45 the controller 12 of the second electronic apparatus 21 sends a signal using its low power second radio 19 to the second radio 19 of the first electronic apparatus 20 with an instruction to power up the first radio 15 of the first electronic apparatus 20.

When in step S34 in FIG. 3, the controller 12 of the first electronic apparatus 20 determines that a signal has been received by its second radio 19, the controller 12 of the first electronic apparatus 20 in step S35 sends a signal through bus 110 to power up its first radio 15. In step S36 and step S46, the controllers 12 of the first and second electronic apparatuses 20 and 21 establish communication via their first radios 15. The controller 12 of the second electronic apparatus 21 then proceeds to send the received message to the first electronic apparatus using its first radio 15 (step S44). The received command/control message, including for example a code download, is communicated from the service provider, to the first electronic apparatus 20 through the path of input/output circuit 16 of the second electronic apparatus 21, first radio 15 of the second electronic apparatus 21, and first radio 15 of the first electronic apparatus 20. The controller 12 of the first electronic apparatus 20 executes appropriate programs to implement the command/control message based on the information received from the service provider.

As mentioned above, various components shown in FIG. 1 can be included or omitted in each of the plural electronic apparatuses. For example, the first electronic device 20 can be a set-top box configured to omit the input/output circuit and the tuner, in which case the set-top box would be of a wireless only IPTV configuration with no wired connection to the gateway apparatus, such as a modem or other set-top box, and no wired connection to the user display device, such as a mobile phone or notebook device. In such a case, all content and data is communicated wirelessly via the first and second radios. Alternatively, components such as the tuner and input/output circuit can be retained, but their functions not utilized in a wireless only IPTV implementation.

The present invention provides power saving by enabling powering down of the first relatively high power radio, and remote powering up of the first radio by communication using a second, lower power, radio.

The present invention can be implemented not only as an apparatus or apparatuses, but also as a method including the steps conducted by the electronic devices as discussed above, which methods as discussed above constitute examples of algorithms. The invention can also be implemented as a program on a non-transitory computer-readable medium for causing a computer, such as a processor in an electronic apparatus, to execute such steps. The non-transitory computer-readable recording medium could be, for example, a CD-ROM, DVD, Blu-ray disc, or an electronic memory device.

The present invention may be implemented as any combination of a system, a method, an integrated circuit, and a computer program on a non-transitory computer readable recording medium.

The control circuit and any other parts of the electronic apparatuses may be implemented as Integrated Circuits (IC), Application-Specific Integrated Circuits (ASIC), or Large Scale Integrated circuits (LSI), system LSI, super LSI, or ultra LSI components which perform a part or all of the functions of the electronic apparatuses, such as set-top boxes. Each of the parts of the present invention can be implemented using many single-function components, or can be one component integrated using the technologies described above. The circuits may also be implemented as a specifically programmed general purpose processor, CPU, a specialized microprocessor such as Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

The sequence of the steps included in the above described algorithms is exemplary, and algorithms having a sequence other than the above described sequences are contemplated. Moreover, steps, or parts of the algorithm, may be implemented simultaneously or in parallel.

The components of the present invention can be in the form of a set-top box box as in the exemplary embodiments disclosed above, or in other standalone devices, or may be incorporated in a television or other content playing apparatus, or other device or appliance, and the scope of the present invention is not intended to be limited on such forms.

It is also contemplated that the implementation of the components of the present invention can be done with any newly arising technology that may replace any of the above implementation technologies.

We claim:

1. A first electronic apparatus in wireless communication with a second electronic apparatus in a wireless local area network (WLAN), said first electronic apparatus comprising:

at least one radio with a first interface that wirelessly communicates information with the second electronic apparatus with a first power consumption according to a first wireless protocol, and a second interface that wirelessly communicates information with the second electronic device with a second power consumption, that is lower than the first power consumption, according to a second wireless protocol;

a memory configured to at least store the current operative state of the first interface on the second electronic apparatus; and a control circuit operably connected with the at least one radio and the memory, to process notifications from the second apparatus, wherein the first electronic apparatus receives a notification that the second electronic apparatus is deactivating its first interface, the current operative state of the first interface on the second electronic apparatus is updated, and if the first electronic apparatus receives a communication intended for the second electronic apparatus after being notified that the second electronic apparatus deactivated its first interface, then the first electronic apparatus sends a predetermined message to the second electronic apparatus on the second interface.

2. The first electronic apparatus according to claim 1, wherein if at least a predetermined condition is met, the first electronic apparatus receives a notification from the second electronic apparatus that the first interface is in a power-up state.

3. The first electronic apparatus according to claim 2, wherein the predetermined condition is that a user has activated the second electronic apparatus.

4. A method for saving power in a first electronic apparatus in wireless communication with a second electronic apparatus in a wireless local area network (WLAN), said method comprising:

determining whether a predetermined condition not related to the physical position of the first electronic apparatus is met in the first electronic apparatus;

directing a first wireless interface that communicates information with the second electronic apparatus according to a first wireless protocol in the first electronic apparatus to power down when the first electronic apparatus has been in a non-use state for more than a predetermined period of time;

notifying the second electronic apparatus when the first wireless interface is powered down;

determining whether a predetermined message is received from the second electronic apparatus by a second wireless interface of the first electronic apparatus, that wirelessly communicates information according to a second wireless protocol, wherein the predetermined message is sent by the second electronic apparatus after the second electronic apparatus receives a communication intended for the first electronic apparatus;

directing the first wireless interface to power up when it is determined that the predetermined message is received while the first wireless interface is in the power-down state; and receiving the communication over the first wireless interface after the first wireless interface is powered-up.

5. A non-transitory computer readable storage medium having stored thereon a program for instructing a computer to implement a method for saving power in a first electronic apparatus in wireless communication with a second electronic apparatus in a wireless local area network (WLAN), said method comprising:

determining whether a predetermined condition exists;

sending an electronic signal to deactivate a first interface, that wirelessly communicates information at a first transmission power with a first power consumption according to a first wireless protocol with the second apparatus, when the predetermined condition exists;

notifying the second electronic apparatus when the first interface is deactivated;

determining whether a predetermined message is received by a second interface, that wirelessly communicates information at a second transmission power with a second power consumption, that is lower than the first power consumption, according to a second wireless protocol; and sending an electronic signal to reactivate the first interface when it is determined that the predetermined message is received via the second interface while the first interface is in a deactivated state, wherein the predetermined message is received from the second electronic apparatus which has received a communication intended for the first electronic apparatus, wherein the communication is received by the first interface after the control circuit reactivates the first interface, and wherein the predetermined condition is that the first electronic apparatus has been in a non-use state for more than a predetermined period of time.

* * * * *